United States Patent
Black et al.

(10) Patent No.: US 6,560,281 B1
(45) Date of Patent: May 6, 2003

(54) METHOD AND APPARATUS FOR GENERATING A CONDENSED VERSION OF A VIDEO SEQUENCE INCLUDING DESIRED AFFORDANCES

(75) Inventors: Michael J. Black, Menlo Park, CA (US); Xuan Ju, Toronto (CA); Scott Minneman, San Francisco, CA (US); Donald G. Kimber, Mountain VIew, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/028,548

(22) Filed: Feb. 24, 1998

(51) Int. Cl.[7] .................................................. H04B 1/66
(52) U.S. Cl. .................... 375/240; 386/106; 386/96; 386/97; 345/775; 345/158; 382/103
(58) Field of Search ........................... 375/240; 386/96, 386/97, 106; 348/552, 169–172, 700, 699; 395/333, 334; 345/158, 156, 775; 382/103

(56) References Cited

U.S. PATENT DOCUMENTS

| | | | | |
|---|---|---|---|---|
| 5,732,227 A | * | 3/1998 | Kuzunuki et al. | 395/333 |
| 5,767,922 A | * | 6/1998 | Zabih et al. | 348/700 |
| 5,835,667 A | * | 11/1998 | Wactlar et al. | 386/96 |
| 6,002,808 A | * | 12/1999 | Freeman | 382/288 |
| 6,084,641 A | * | 7/2000 | Wu | 348/722 |
| 6,119,123 A | * | 9/2000 | Elenbaas et al. | 707/102 |
| 6,160,917 A | * | 12/2000 | Sommer | 382/236 |
| 6,191,773 B1 | * | 2/2001 | Maruno et al. | 345/158 |
| 6,215,890 B1 | * | 4/2001 | Matsuo et al. | 382/103 |
| 6,219,837 B1 | * | 4/2001 | Yeo et al. | 725/38 |

OTHER PUBLICATIONS

H. Kollnig, H.–H. Nagel, and M. Otte, Lecture Notes in Computer Science, vol. 801, Jan–Olof Eklundh (Ex.) Computer Vision—ECCV '94, "Association of Motion Verbs with Vehicle Movements Extracted From Dense Optical Flow".

M. M. Yeung, et al.Dept. of Electrical Engineering, Princeton Univ., Princeton, NJ, IS&T/SPIE Multimedia Computing And Networking 1995. "Video Browsing Using Clustering And Scence Transitions on Compressed Sequences".

(List continued on next page.)

*Primary Examiner*—Chris Kelley
*Assistant Examiner*—Shawn S. An
(74) *Attorney, Agent, or Firm*—Fay, Sharpe, Fagan, Minnich & McKee, LLP

(57) ABSTRACT

A method and apparatus analyzes and annotates a technical talk typically illustrated with overhead slides, wherein the slides are recorded in a video sequence. The video sequence is condensed and digested into key video frames adaptable for annotation to time and audio sequence. The system comprises a recorder for recording a technical talk as a sequential set of video image frames. A stabilizing processor segregates the video image frames into a plurality of associated subsets each corresponding to a distinct slide displayed at the talk and for median filtering of the subsets for generating a key frame representative of each of the subsets. A comparator compares the key frame with the associated subsets to identify differences between the key frame and the associates subset which comprise nuisances and affordances. A gesture recognizer locates, tracks and recognizes gestures occurring in the subset as gesture affordances and identifies a gesture video frame representative of the gesture affordance. An integrator compiles the key frames and gesture video frames as a digest of the video image frames which can also be annotated with the time and audio sequence.

17 Claims, 3 Drawing Sheets

OTHER PUBLICATIONS

H.J. Zhang et al., Institute of Systems Science, National University of Singapore, Multimedia 1995, San Francisco, CA ACM 0–89791–751–0/95/11 "Video Parsing, Retrieval and Browsing: An Integrated and Content–Based Solution".

Di Zhong, Hong Jian Zhang, Shih–Fu Chang, Institute of System Science, National Universityof Singapore, SPIE vol. 2670/239. "Clustering Methods for Video Browsing and Annotation".

S.S. Intille et al.; Perceptual Computing Group, MIT Media Lab, 1995 IEEE 0–8186–7042–9/95, "Closed–World Tracking".

R. Lienhart et al., Univ. of Mannheim, Germany, Communications of ACM, pp. xx–yy, Dec. 1997, "Video Abstracting".

Richard Mann, Allan Jepson, Jeffrey Mark Siskind; Department of Computer Science, University of Toronto, Toronto, Ontario, Canada, "Computational Perception of Scene Dynamics".

Jeffrey Mark Siskind and Quaid Morris, Department of Computer Science, University of Toronto, Toronto Ontario Canada "A Maximum–Likelihood Approach to Visual Event Classification".

Smith et al., Dept. of Electrical and Computer Engineering, Carnegie Mellon University, Pittsburgh, PA 15213, 1997 IEEE 10632–6919/97 "Video Skimming and Characterization through the Combination of Image and Language Understanding Techniques".

Ju et al., IEEE Transactions on Circuits and Systems for Video Technology: Special Issue, Oct. 1997, "Summarization of Technical Talks: AUtomatic Analysis of Motion and Gesture".

Minerva M. Yeung, Boon–Lock Yeo, IEE Transactions on Circuits and Systems For Video Technology, vol. 7, No. 5, Oct. 1997 "Video Visualization for Compact Presentation and Fast Browsing of Pictorial Content".

* cited by examiner

METHOD AND APPARATUS FOR GENERATING A CONDENSED VERSION OF A VIDEO SEQUENCE INCLUDING DESIRED AFFORDANCES

BACKGROUND OF THE INVENTION

This invention pertains to the art of data processing systems and more particularly to a system for condensing a data frame sequence into a digest comprised of key data frames and frames having desired affordances therein particularly useful for web page publication.

Researchers have been increasingly interested in the problem of browsing and indexing video sequences. By "annotating" such a work is meant extracting of information from still or moving images comprising the work, and then portraying this information in some way that facilitates its access. "Segmentation" refers to detecting key frames of interest with video. "Video summarization" combines both annotation and segmentation. The majority of work to facilitate such browsing and indexing has focused on the detection of key frames and scene breaks in general, unconstrained, video databases. For these methods to be useful on general video sequences they have used simple image processing techniques and do not attempt any high-level analysis of the content of the sequence.

A simple example of a video browsing and indexing system comprises summarizing and annotating data. In prior known versions, this was an off-line or on-line process where indices of the events and the images corresponding to these events are the outputs. This information is used to make a summary web page containing images of each event and their time indices. Clicking on the image, the users can go to a new page with more information about this event. For instance, if the stored item is a video recording of an oral presentation with reference slides, the web page may contain a high resolution image of the slides, so that the users can actually read the words on the slides. Clicking on the time, the monitor in the user's office will start to play the video from this particular time.

Generally speaking, a particular goal of any such automatic video summarization is to be able to save a small set of frames that contain most of the relevant information in the video sequence. That is, one wants to find where the important changes occur. In a restricted domain of overhead presentations a number of "changes" can occur in the image sequence. There are two classes of such changes which are called "nuisances" and "affordances".

Nuisance changes are those which have no relevant semantic interpretation. Examples of this are when the speaker occludes the slide with their hand or body or when the speaker moves the slide. These nuisance changes should be ignored in an analysis and summarization of the video sequence.

Affordances, on the other hand, are changes in the video sequence that have a semantic interpretation with respect to the presentation. For example, speakers often write, point, or make repetitive gestures at locations on the slide to which they are referring. Another common action is to cover a portion of the slide and gradually reveal the underlying text. These changes are called "affordances" because one can take advantage of them to acquire more information about the presentation. Automatic recognition of the affordances can provide a rich description of the video. Recognition of the affordances will allow the production of annotated keyframes from the video that will allow users to later access portions of the talk where the speaker gestured at a particular location on the slides. Accordingly, it is an object of the invention to provide an improved and novel approach of annotating a meeting video to generate a condensed version of the entire video sequence limited to only the significant display data.

The two main themes explored in previous work on automatic video summarization can be broadly described as segmentation and analysis. Segmentation focuses on finding scene changes or key frames in the video while analysis focuses on understanding actions or events (typically in a more restricted domain). Both types of analysis are important to providing useful video summarization.

Scene-break detection is a first step towards the automatic annotation of digital video sequences. Generally speaking, scene breaks include cuts, an immediate change from one scene to another, dissolves, a gradual change between two scenes; and fades, a gradual change between one screen and a constant image.

There are two basic types of algorithms for scene-break detection. The first uses image-based methods, such as image differencing and color histogramming. The second comprises feature-based method and uses image edge pixels. These algorithms typically compute the differences between two consecutive images and, when the difference is larger than a threshold, there may be a scene break.

Simple image-based differencing tends to over-segment the video sequence when there is motion present in the scene or when the camera is moving since many pixels will change their color frame to frame. Zabih et al., "Video Browsing Using Edges and Motion", in *CVPR*, pp. 439–446, 1996, have proposed a feature-based method. They detected the appearance of intensity edges that are distant from edges in the previous frame. A global motion computation is used to handle camera or object motion. Such a method can detect and classify scene breaks that are difficult to detect with image-based methods. However, their motion estimation technique (the correlation method and the Hausdorff distance method) can not handle multiple moving objects well. This may result in false negatives from the detector. Generally speaking, the image- and feature-based methods are naive approaches that use straightforward measurements of scene changes. Accordingly, a need exists for a system that can recognize an process multiple moving objects, while minimizing scene breaks to an appropriate minimum.

BRIEF SUMMARY OF THE INVENTION

In accordance with the present invention there is provided a method and apparatus for automatically acquiring an annotated digested description of a technical talk utilizing video images such as overhead transparencies as a part of the talk. A particular advantage of such a system is that it can be used to construct a web page version of the video taped talk which contains only the more relevant information, i.e., such as the speaker's slides and gestures that may be semantically important. The resulting digested talk can be used as a search and index tool for accessing the original audio and video.

More particularly, the subject invention is comprised of a method and apparatus for generating a condensed version of a video sequence suitable for publication as an annotated video on a web page. A video sequence is first recorded and stored as a set of image frames. The image frames are stabilized into a warped sequence of distinct and stationary scene changes, preferably each corresponding to a speaker slide, wherein each scene change is comprised of an associated subset of the image frames. A key frame is generated for each scene change representative of the associated subset. Each key frame is compared with the associate subset for identifying image frames including desired affordances such as semantically significant speaker gestures, e.g. pointing. The condensed version of the video is compiled as an integration of the key frames and the frames with the desired affordance images. Thus, redundant image frames and nuisance variations can be deleted from the original video sequence so that the digest is a much more compact and communicable version of the technical talk. Lastly, the condensed version is annotated to time or an audio for a useful representation of the talk.

In accordance with another aspect of the present invention, the stabilizing step comprises analyzing every two consecutive frames in the video sequence for estimating a global image motion between the consecutive frames. When the estimating includes generating an error computation in excess of a predetermined limit, the excessive error computation is interpreted as a scene change and a demarcation between subsets of the image frames.

In accordance with yet another aspect of the present invention, a template image frame is generated from the associate subset by median filtering of the associated subset, and then matching the template image to a closest one of the associated subset. The closest match thus becomes the key frame.

In accordance with another aspect of the present invention, the identification of desired affordances is affected by computing pixel wise differences between the key frame and the frames of the associated subset. An active boundary contour is detected in the comparison corresponding to a pointing gesture by the speaker. Such a contour is analyzed and then recognized in a predetermined vocabulary as a pointing gesture. A selected frame best illustrating the pointing gesture can be retained as the image frame to be integrated into the condensed version of the video sequence. The key frame is annotated with icons indicating the location of pointing gestures.

The subject invention accomplishes its more sophisticated condensation of a video sequence through the implementation of four basic steps. First, every two consecutive images in the sequence are analyzed for estimating the global image motion between the frames using a robust regression method. The motion information is used to compute a warped sequence where the sequential images (slides) are stabilized. Second, the stabilized sequence is processed to extract slide templates, or key frames. The key-frame sequence is a condensed representation of the slides shown. Third, a pixel-wise difference image is computed between the slide templates and the corresponding frames in the stabilized image sequence. These difference images contain only occluded/disoccluded objects, e.g., the gestures. The gestures are identified using the deformable contour model. By-analyzing the shape of the contour and its motion over time, pointing gestures are recognized and the location on the slide to which the speaker is referring is recovered. Finally, the key frames and gesture information can be integrated to annotate the video.

The subject invention is applicable to broader applications than merely condensing video talks and can be employed for a digest compilation of any sequential set of data frames wherein redundant adjacent frames and nuisance variations are desired to be deleted.

One benefit obtained by the present invention is the conversion of a memory expensive set of data frames corresponding to a sequential video to a condensed version containing merely data frames of semantic significance.

Another benefit obtained from the present invention is a method and apparatus which provides for improved ease of recognition of desired affordances in video image frames such as those corresponding to a pointing gesture relative to a part of the video image.

A further benefit of the present invention is the detecting of a pointing gesture by computing an active boundary for a video frame and identifying a contour in the active boundary corresponding to the pointing gesture.

Other benefits and advantages of the subject new method and apparatus for forming a digested compilation of a sequential set of data frames will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION OF THE INVENTION

Figure 1:
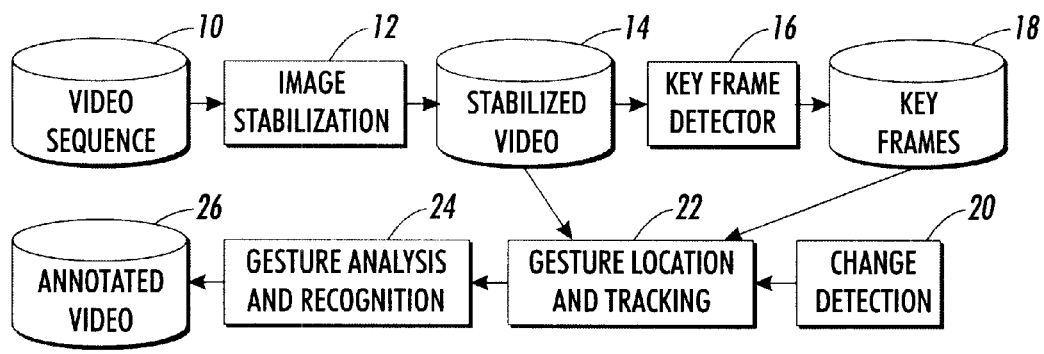
FIG. 1 comprises a block diagram illustrating an overview of the system and a flow chart of the various processing steps implemented therein.

Referring now to the drawings where the showings are for purposes of illustrating the preferred embodiments of the invention only, and not for purposes of limiting same, FIG. 1 shows a diagrammatic overview of the apparatus and method of the subject invention. A video sequence 10 comprising a recording of a presentation such as a technical talk is typically constructed of a plurality of data frames of the video image. The memory expense of such a video sequence is rather large, difficult to transfer and unwieldy for use as a search and indexing tool for accessing the original audio or video or selected parts thereof. One can readily imagine an hour long talk utilizing a set of slides wherein the slides themselves are merely stationary displays at the talk and need not be stored in memory as a continuing sequence of video frames. Accordingly, a first step in condensing the video sequence is to convert the recorded video sequence 10 into sets of image frames which can be analyzed and segregated into a greatly reduced subset of key frames. To accomplish this purpose, the image must be stabilized in a stabilizing processor 12. The subject invention employs a robust motion estimation method useful for recovering the motion of overhead slides accurately. During the talk presentation, the slide will frequently be slightly adjusted, bumped or moved by the speaker without intent to actually change the substantive content of the slide that is being communicated to an audience. The subject invention automatically stabilizes the video frames of the image sequence for reliably detecting slide changes in the sequence and segregating the image frames into a warped sequence of distinct and stationary scene changes wherein each scene change is comprised of an associated subset of the image frames.

Motion Estimation for Image Stabilization

Image motion between two frames can be estimated using a parametric model. Parametric models of image motion make explicit assumptions that the image flow can be represented by a low-order polynomial. For example, we assume that the slides are always perpendicular to a camera's viewing axis, and they can be modeled as a rigid plane. Therefore, the image motion can only be translation, scaling, or rotation. For small motions, these can be described by the following four-parameter model:

$$u(x,y) = a_0 + a_1 x - a_2 y. \quad (1)$$

$$v(x,y) = a_3 + a_2 x + a_1 y. \quad (2)$$

where $a = [a_0 \cdot a_1 \cdot a_2 \cdot a_3]$ denotes the vector of parameters to be estimated, and $u(x \cdot a) = [u(x,y) \cdot v(x,y)]$ are the horizontal and vertical components of the flow at image point $x = [x,y]$. The coordinates $(x,y)$ are defined with respect to a particular point; here this is taken to be the center of the image.

To estimate the motion parameters, a, for a given image we make the assumption that the brightness pattern within the image remains constant while the image may translate, scale, or rotate. This brightness constancy assumption is formulated as:

$$I(x + u(x.a).t+1) = I(x.t). \quad \forall x \in R \quad (3)$$

where a denotes the motion mode for the pixels in image R. I is the image brightness function and t represents time. This equation simply states that the motion $u(x.a)$ can be used to warp the image at time $t+1$ to make it look like the image at time t.

Note that the brightness constancy assumption is often violated in practice due to changes in lighting, occlusion boundaries, specular reflections, etc. In our domain of viewgraphs, violations will occur in situations in which the speaker occludes their slides. Robust regression has been shown to provide accurate motion estimates in a variety of situations in which the brightness constancy assumption is violated. To estimate the slide motion, a, robustly, we minimize $$E_s = \sum_{x \in R} p(I(x + u(x \cdot a) \cdot t + 1) - I(x \cdot t) \cdot \sigma). \quad (4)$$

with respect to the parameters a for some robust error norm p where a is a scale parameter. Violations of the brightness constancy assumption can be viewed as "outliers" and the function p should be chosen so that it is insensitive to these large errors.

Equation 4 is minimized using a simple gradient descent scheme. The robust formulation of Equation 4 means that the algorithm implemented by the processor 12 estimates the dominant motion in the scene (i.e. the slide motion) and automatically ignores the image points that belong to other motions (the gestures). Gestures will be tracked using a different technique described below.

The stabilized video 14 thus can be stored as a set of associated subsets of image frames wherein each stabilized image frame corresponds to a slide presented at the talk. The motion information acquired from the estimation analysis thus provides a stabilized image sequence which can be employed to identify a key frame for each associated subset of image frames.

Key-Frame Detection

Given an image sequence corresponding to a particular slide, stabilization is just a process of warping each of the images towards a reference image by taking into account the cumulative motion estimated between each of the frames in the sequence. Since minimizing Equation 4 can only estimate small image motions between two consecutive images, the motion between the reference image and each following frame is computed. Given $a_{n-1}$, the motion between the reference image and frame n−1, and $a_n^*$, the motion between frame n−1 and n, image motion between the reference image and frame n is:

$$d \, a = \begin{bmatrix} a_{n_1}^* & a_{n_2}^* \end{bmatrix} \begin{bmatrix} a_n - 1_0 & a_n - 1_1 & a_n - 1_2 & a_n - 1_3 \\ a_n - 1_3 & -a_n - 1_2 & a_n - 1_1 & -a_n - 1_0 \end{bmatrix}$$

where $a_{(n-1,3)}$, for example, represents the parameter $a_3$ from the previous frame n−1. The combination of two similar transformations (Equations 1 and 2) is still a similar transformation.

A simple heuristic is used so that the reference frame is the first non-blank image for which the motion is smaller than a threshold. For subsequent images, if the motion estimation method succeeds (has low error) then the image belongs to the same sub-sequence as the reference frame. When the motion estimation method fails, it means that two consecutive frames are significantly dissimilar and can not be modeled by Equations 1 and 2. Thus, it typically corresponds to a change of slides, and this frame ends the sub-sequence and the processor begins looking for the next stable reference image. In the domain of overhead presentations this simple strategy works well.

Since only the dominant (slide) motion is estimated in the scene, the warped sequence contains both the stabilized slide and moving objects, such as the hand of the speaker. To get a template image that contains no gestures, a key frame detection processor 16 utilizes a median temporal filter to remove the moving objects in the video sequence. At each image position, all the values at this position in the stabilized frames are taken, a median value is formed, and the intensity value of the slide template is used. The median filter can filter out the gestures, hand motions, and partial occlusion. Finally, the stabilized frame stored in the stabilized video 14 which is most similar to the template is formed and this particular frame is used as the key frame of the slide.

Figure 2:
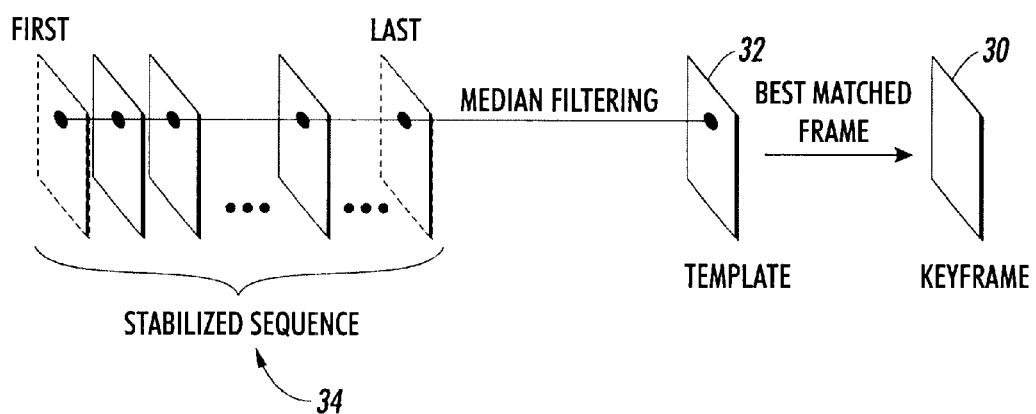
FIG. 2 is a diagrammatic illustration of the generation of a key frame from a set of the image frames.
Figure 3A:
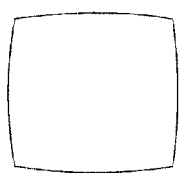
FIGS. 3A–3D illustrate how a gesture by a human hand can be tracked as a variable contour of a video image frame.
Figure 3B:
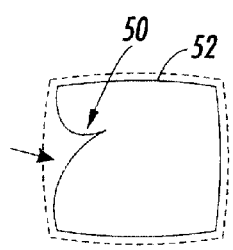
Figure 3C:
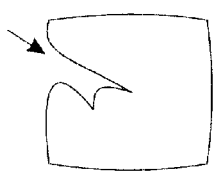
Figure 3D:
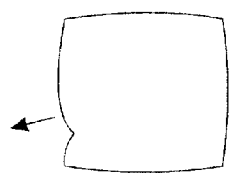

With reference to FIG. 2, the foregoing process of stabilizing the image frames 34, filtering the frames to obtain a template 32 and matching the template to a best frame in the subset to obtain the key frame 36 is illustrated diagrammatically.

Gesture Tracking

The subject invention has the important advantage of identifying image frames including desired affordances and undesired nuisances so the affordances can be retained and the nuisances deleted. Such processing, generally referred to as "gesture tracking", occurs via a comparator 20 for detection of change between the key frames 18 and the stabilized subset of associated image frames 14, and then locating and tracking 22 the gestures on the image frames, and analyzing and recognizing 24 those gestures so that they can be integrated with the key frames to form the annotated video 26.

If one computes the absolute difference between the slide template 32 and images in the warped sequence 34, the non-zero pixels in the image must correspond to gestures, covered data, or written text. Thus, the computing of pixel wise differences between a key frame 36 and the frames 34 of the associated subset provides a basis for identifying the affordances. Keeping in mind that the pointing gestures will initiate from the boundary, monitoring the active boundary in particular will allow pointing identification. Since all the gestures must enter the scene or leave the scene from the image boundary, new material can not suddenly appear in the middle of the image. Therefore, one can let the image boundary deform when a "thing" enters, so that it tracks the contour of the entering object. If the object leaves, the deformable contour will expand to the image boundary (see FIG. 3).

By using controlled continuity splines, or "Snakes" (Kass, et al. "Snakes: Active Contour Models." In *ICCV*, pp. 259–268, 1987.), to model the deformable contour, the snake can lock on to features of an image structure by minimizing an integral measure which represents the snake's total energy. Due to the dynamic property of the snake model, one can achieve automatic tracking of a contour from frame to frame.

The behavior of a snake is controlled by internal and external forces. The internal forces serve as a smoothness constraint, and the external forces guide the active contour towards image features. Given a parametric representation of an image curve (v(s)=x(s), y(s)), the energy function is defined as $$\epsilon_{snake} = \int_0^1 \epsilon_f(v(s)) + \epsilon_{ext}(v(s))ds. \quad (5)$$

the function $\epsilon_{int}$ represents the internal energy of the active contour and is composed of a first and second order derivative terms ($v_S$ and $v_{SS}$ respectively):

$$\epsilon_{int}=(\alpha|v_S(s)|^2+\beta|v_{SS}(s)|^2)/2. \quad (6)$$

The first-order term makes the snake act like a string and the second-order term makes it act like a rod. Adjusting the weights $\alpha$ and $\beta$ controls the relative importance of the first and second terms. $\epsilon_{ext}$ represents the external potential $$P(x,y)=c[G_\sigma*\Psi(x,y)], \quad (7)$$

where c is a constant weight, $\Psi$ is a difference image, and $G_{\sigma4}*\Psi$ denotes the difference image convolved with a Gaussian smoothing filter. The active contour model in Equation (5) attempts to find a contour which is both smooth and which minimizes the value of P(x,y) at every snake node (x,y). P(x,y) is a scaler potential function defined over image plane. If the value of P is large over some region that overlaps the boundary of the image (because the hand has entered the slide) then the snake will deform around the region until P(x,y) is small enough along the contour and both the internal and external forces are balanced. If the hand leaves the frame the internal smoothness forces will push the snake back out to the image boundary.

Minimizing the energy function of Equation 5 gives rise to two independent Euler equations. The tracking behavior of the snake is achieved by numerical, iterative solution of these two equations using techniques from variational calculus (see Kass, et al. above for details).

It is well known that the snake model is sensitive to its initial position. The energy of the snake depends on where the snake is placed and how its shape changes locally in space. If the initial position is not chosen properly, the contour will fail to converge to desirable features. We can initialize a closed snake to be at the position of image boundary, and avoid the hard problem of automatic initialization of snakes.

FIG. 3 shows how the snake 50 deforms to find the object boundary 52. The image shows the absolute difference between one of the frames in the sequence and the corresponding key frame. Once the snake locks onto image features, we can change the external image to the next frame. The snake is able to track the moving object when the images change.

Figure 4:
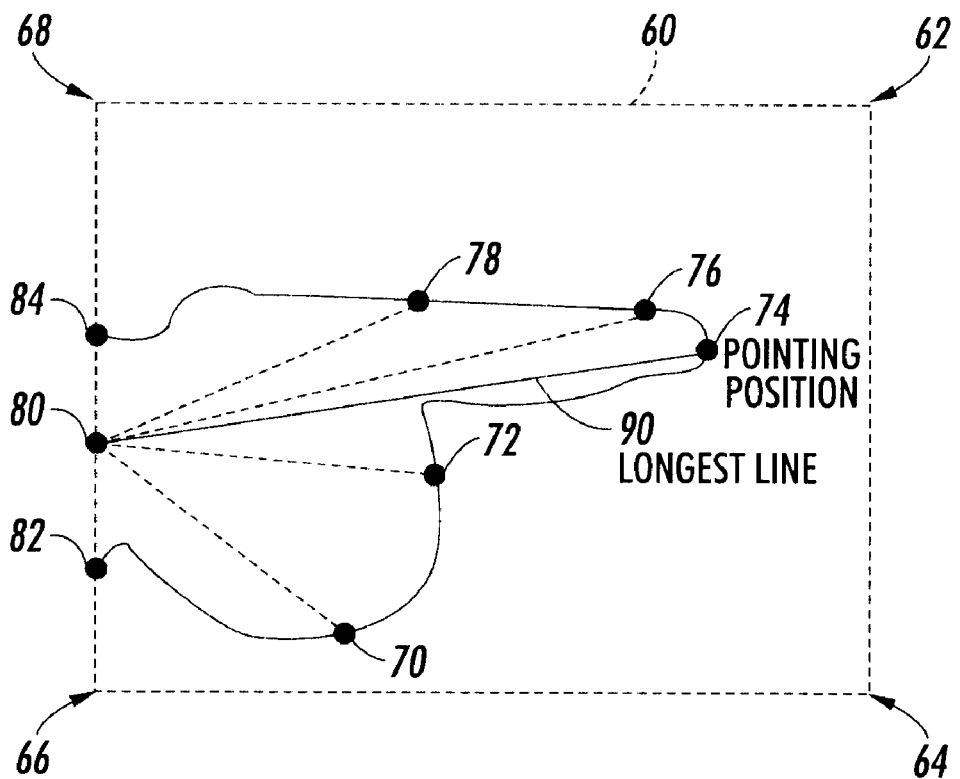
FIG. 4 is a diagrammatic illustration of how a hand contour can be utilized for identifying a pointing position.

From the snake nodes, one can detect if and where, the speaker is pointing on the slides. The subject method has three steps. With reference to FIG. 4, first a bounding quadrilateral 60 is fit to the snake nodes by finding the four corners 62, 64, 66, 68. The nodes 70, 72, 74, 76, 78 that are not close to any edge of the quadrilateral belong to the deformed part of the Snake, that is, the contour of the object.

Second, a starting point 80 is defined to be the middle point between the first node and the last node of the contour. Among all the snake nodes on the contour, the one 74 that is furthest from this starting point is defined as the pointing position. The line 90 which connects the starting point and the pointing position gives the rough pointing direction.

Finally, the pointing gesture is recognized. Two heuristics are used to filter out the non-gestures. The first is a constraint filter for the spatial structure of the gesturing object; it should have a definite "point". Pointing positions that are too close to the first or last node in the segmented gesture are therefore eliminated.

The second heuristic models the expected temporal pattern of gestures to set a vocabulary of desired pointing gestures. One only recognizes an action as a pointing gesture if the speaker points at one position for a time longer than a threshold (e.g., longer than 0.5 second). If a hand were to move continuously from left to right in the sequence, it will not be classified as a pointing gesture. On the other hand, if the finger stays at roughly the same position for a while, it will be recognized as a pointing gesture. More sophisticated techniques could be employed for recognizing more complex gestures.

Although the subject invention is described with reference to a preferred application to video slides, it is also applicable to more general applications, such as where the images comprises other kinds of frames of data and, instead of pixel comparison of data, words of the frames are compared in accordance with the steps of the invention.

The invention has been described with reference to the preferred embodiments. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. A method for generating a condensed version of a video sequence suitable for publication as an annotated video comprising steps of:

storing the video sequence as a set of image frames;

stabilizing the image frames into a warped sequence of distinct and stationary scene changes wherein each scene change is comprised of an associated subset of the image frames;

generating a key frame for each scene change representative of the associated subset including generating a template image frame from the associated subset by median filtering of the associated subset and matching the template image to a closest one of the associated subset, wherein the closest one comprises the key frame;

comparing the key frame with the associated subset for identifying image frames including desired affordances; and compiling the condensed version to comprise a set of key frames and desired affordance images.

2. The method as defined in claim 1 wherein the stabilizing comprises analyzing every two consecutive frames in the video sequence for estimating a global image motion between said consecutive frames.

3. The method as defined in claim 2 wherein the estimating comprises a robust regression method.

4. The method as defined in claim 3 wherein the estimating includes generating an error computation in excess of a predetermined limit and identifying the excessive error computation as one of the scene changes.

5. The method as defined in claim 1 wherein said comparing comprises computing pixel-wise differences between the key frame and the associated subset.

6. The method as defined in claim 5 wherein a one of the desired affordances comprises a pointing gesture and said computing the pixel-wise differences includes detecting an active boundary contour in the associated subset representative of the pointing gesture.

7. The method as defined in claim 5 wherein said computing the pixel-wise differences comprises defining a predetermined vocabulary of the desired affordances.

8. The method as defined in claim 1 wherein the desired affordances include a pointing gesture and the identifying comprises identifying the pointing gesture by forming a boundary edge for an image and detecting a contour in the boundary edge representative of the pointing gesture.

9. The method as defined in claim 8 wherein detecting the contour includes computing a distance from an associated boundary edge position at the contour and an innermost position of the contour, a line of the distance being detected as a pointing direction of the pointing gesture.

10. The method as defined in claim 1 further including deleting redundant image frames and nuisance variations from the video sequence.

11. A method for forming a digested compilation of a sequential set of data frames including deleting redundant adjacent frames and nuisance variations therein, comprising:

generating a warped sequence of the sequential set wherein significant changes in the sequential set are detected for segregating the sequential set into associated subsets;

detecting a key frame representative of each the associated subsets;

comparing each key frame with each associated subset for detecting the nuisance variations and data frames having desired affordances, the detecting the nuisance variations including a word-wise comparison between the key frame and the associated subset; and, integrating the key frames with the data frames having the desired affordances and thereby deleting the redundant data frames and the data frames having the nuisance variations, to form the digested compilation.

12. The method as defined in claim 11 wherein the generating the warped sequence comprises detecting the significant changes by an error estimation calculation wherein the significant changes correspond to an error calculation greater than a predetermined limit.

13. A system for analyzing and annotating a technical talk recorded as a video and audio sequence for condensing the video sequence into a digest of key video frames annotated to time and the audio sequence, comprising:

a recorder for recording the technical talk as a sequential set of video image frames;

a stabilizing processor for segregating the video image frames into a plurality of associated subsets each corresponding to a distinct slide displayed at the talk and for median filtering of the subsets for generating a key frame representative of the subsets;

a comparator for comparing the key frame with the associated subset to identify differences between the key frame and associated subset comprising nuisances and affordances;

a gesture recognizer for locating, tracking and recognizing gestures occurring in the subset as a gesture affordance an for identifying a gesture video frame representative of the gesture affordance, wherein the gesture recognizer includes a vocabulary of desired gesture affordances and a comparator for comparing the subset with the key frame and matching the affordances located thereby with the vocabulary; and, an integrator for compiling the key frames and the gesture video frames as a digest of the video image frames and for annotating the digest with the time and the audio sequence.

14. The system as defined in claim 13 wherein the stabilizing processor comprises means for analyzing every two consecutive frames in the video sequence for estimating a global image motion between said consecutive frames and for identifying the distinct slide by an estimation error in excess of a predetermined limit.

15. The system as defined in claim 13 wherein desired gesture affordances comprise a pointing gesture.

16. The system as defined in claim 13 wherein desired gesture affordances comprise writing or revealing gestures.

17. The system as defined in claim 13 further including means for accessing the technical talk from a web page.

* * * * *